Sept. 8, 1936.  E. E. CHARLTON ET AL  2,054,030
ELECTRIC DISCHARGE DEVICE AND METHOD OF MANUFACTURE
Filed Aug. 10, 1925
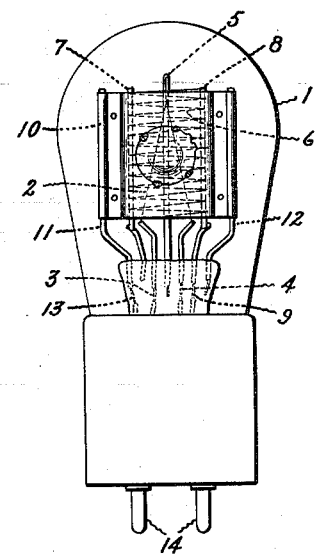
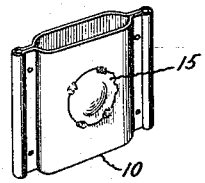
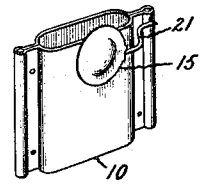
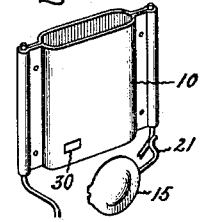
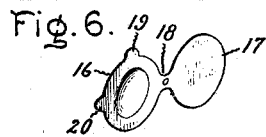
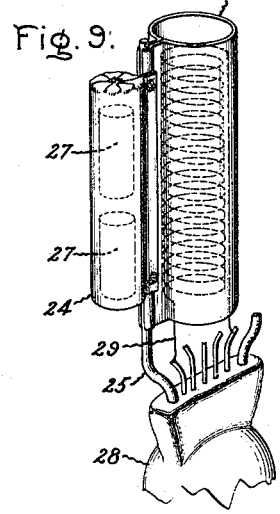
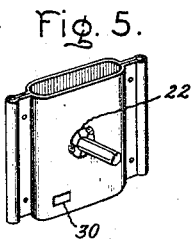
Inventors:
Ernest E. Charlton
Dow O. Whelan,
by
Their Attorney Patented Sept. 8, 1936

2,054,030

UNITED STATES PATENT OFFICE 2,054,030

ELECTRIC DISCHARGE DEVICE AND METHOD OF MANUFACTURE

Ernest E. Charlton and Dow O. Whelan, Schenectady, N. Y., assignors to General Electric Company, a corporation of New York Application August 10, 1925, Serial No. 49,164

10 Claims. (Cl. 250—27.5)

The present invention relates to the manufacture of electrical discharge devices which contain an easily vaporizable material, and in particular, contain a highly reactive metal, such as one of the alkali metals.

In accordance with a convenient method described in the Charlton Patent No. 1,738,420, granted December 3, 1929, a metal of this character has been introduced by reduction from a mixture capable of evolving the desired metal when chemical reaction is caused therein, the mixture being applied with a suitable binder upon one of the electrodes of the device. The electrode may be heated to a reaction temperature by electron bombardment, by high frequency induction or otherwise.

In accordance with the present invention, certain improvements have been provided in the practice of this method by placing the charge to be volatilized in a nearly closed capsule which is adapted to be heated to a desired temperature. Preferably this capsule is located in such a position in the envelope that it may be heated by electric induction independently of the electrodes in the device. For example, the capsule may be arranged at such angle to the main electrodes that a high frequency coil may be placed independently in inductive relation to the capsule or to the electrodes.

The main advantages of this improvement are as follows:

(1) A paste or binder to secure the material to be vaporized on a support is not required, thus avoiding the introduction of foreign material from which deleterious gas may emanate.

(2) The solid by-products of a chemical reaction in the charge are held within the capsule where they can do no harm.

(3) The electrodes, particularly the plate, can be degasified before the reactive vapor is produced in the device.

(4) The charge evolving the desired metal may be heated after the electrodes have been denuded of gas and may be heated by high frequency induction without reheating the electrodes to a substantial degree.

Our invention is illustrated by the accompanying drawing, which shows in Fig. 1 an electron discharge device embodying my invention; Figs. 2 to 5 inclusive, illustrate different mountings for capsules in their relation to an electrode; and Figs. 6 to 9 inclusive, are detail views illustrating the structure of different forms of capsules. Fig. 10 is a diagram showing the position of a high frequency coil for inducing heating currents in the anode while Fig. 11 illustrates by diagram, the position of the coil for heating the capsule without appreciably heating the anode.

Our invention may be utilized to introduce a vaporizable material, as for example, one of the alkali metals, into a vacuum tube of the radio detector or amplifier type, such as shown in Fig. 1. This tube includes in a sealed container 1 the usual electrodes comprising a filamentary cathode 2 connected to leading-in wires 3, 4 and anchored upon a support 5, also a grid 6 mounted upon the supports 7, 8 and connected to a sealed-in conductor 9 and an anode or plate 10, which is mounted upon the wires 11, 12, and connected to a leading-in conductor 13. The base terminals for these various electrode members have been merely indicated at 14. As more clearly shown in Fig. 2, a capsule 15 is mounted upon the anode 10 by spot welding or other convenient means. As shown in Fig. 6 this capsule consists of two disc-shaped parts 16, 17 connected by a narrow neck portion 18. The disc 16 is slightly concave and is provided with two small ears 19, 20. These parts may be stamped by a single operation out of thin sheet metal, and should consist of material such as nickel and molybdenum which may be heated to the reaction temperature of a charge placed therein without danger of being itself volatilized.

The charge of material, from which the volatilizable ingredient is obtained, is placed in the concave or dished portion of the disc 16 and the disc 17 is closed upon it as a cover, as shown in Fig. 7, the ears 19, 20 being bent over to hold the two parts of the capsule in fixed relation. This capsule then is introduced into the tube either by mounting directly upon one of the electrodes, as shown in Fig. 2, or by mounting the capsule upon a suitable stem 21, as shown in Figs. 3 and 4. In some cases the capsule may be made tubular in shape, such as shown in Fig. 8. In this case a flanged portion 22 is provided at the rim of the tube upon which a cover 23 may be applied by welding or otherwise. The flanged portion 22 may be attached directly to the anode, as indicated in Fig. 5, or may be otherwise mounted, for example, as has been illustrated in Figs. 3 and 4 with respect to the disc-shaped capsule. The tubular portion of the capsule shown in Fig. 8 preferably is provided with nearly closed slits through which vapor may escape.

In Fig. 9 is shown a tubular capsule 24 which is carried by one of the lateral supports 25 of an anode 26, and which contains two pellets 27 of reaction mixture. The ends of the capsule are crimped to hold the charge 27 in place while leaving crevices for the escape of vapor. The stem 28, the grid 29, and other parts of the tube, are merely indicated for the sake of clearness.

When a reactive charge, such as a mixture of a chloride of caesium or other alkali metal, and a reducing agent such as metallic calcium or magnesium, is to be placed in the capsule, the ingredients preferably are first compacted into coherent form. For example, the mixture may be formed as a strip by extrusion under heavy hydraulic pressure, the strip later being subdivided in convenient lengths. The material is carefully dried as by baking in a vacuum and is maintained in a dry condition until ready for use. Just before the assembly of the different parts of the vacuum tube, a pellet of this dry mixture is placed in the capsule, which then is closed, as described, and mounted in the vacuum tube.

In the form shown in Figs. 3, 4, and 9, the capsules 15 and 24 may be heated by high frequency independently of the anodes 10 and 26 because of their location in such a position that the high inducing frequency coil (not shown) may be placed about the vacuum tube so as to first induce a heating current in the anode to degasify the anode without appreciably heating the capsule. The anode constitutes a short-circuited secondary by reason of having a closed perimeter so that the high frequency coil may induce currents in this electrode. It will be noted that the principal axis of the capsule, i. e. the axis of rotation in the case of a circular member, is disposed normal to the longitudinal axis of the anode and that the metal of the capsule is so disposed that the path for current induced by the coil in this position is short and substantial heating of the capsule is precluded. The relative position of these axes is clearly shown in Figs. 3 and 4 wherein line $a$ indicates the longitudinal axis of the anode and the line $b$, the axis of rotation or principal axis of the capsule. While these axes are shown as being perpendicular or displaced 90° with respect to one another, it is evident that the axes may span an angle of any size sufficient substantially to isolate the heating of the anode from that of the capsule. In Fig. 10, a high frequency coil 31 is shown in a position to heat the anode 10 without appreciably heating the capsule and in Fig. 11, a coil 32 is provided in a position removed 90° from the first position so as to heat the capsule without appreciably heating the anode. The high frequency coil then may be placed in such a position with respect to the capsule that the latter is heated to a temperature at which a reaction occurs in the charge within the capsule, resulting in the volatilization of the alkali metal or whatever material is generated by the reaction, the vapor penetrating through the crevices in the capsule into the evacuated space of the container 1. For example, in the case of the construction shown in Fig. 3 in which the capsule 15 is spaced away from the plate 10, the inducing high frequency coil first is placed about the plate to bake it out. After the gases evolved by this bake-out have been evacuated the tube is sealed and the inducing coil then placed at right angles to the capsule and sufficient current is induced therein to heat the charge to a reaction temperature. In the case of the construction shown in Fig. 4, the coil also is first placed about the plate and then may be either lowered or is placed about the capsule from the side of the tube that is in a direction normal to the plate.

In some cases, as when the plate 10 is heated in a vacuum prior to mounting in the tube, the capsule may be heated together with the plate. The devices shown in Figs. 2 and 5 are constructed to be treated in this manner. In the case of the device shown in Fig. 5, the heating of the capsule occurs largely by heat conduction from the plate.

It is advantageous in some cases to volatilize a material which is capable of combining with gas, such as calcium or magnesium, during the bake-out of the anode or plate. We have indicated at 30 in Figs. 4 and 5, a piece of ribbon of magnesium or the like, fastened to the plate where it will be volatilized when the plate is heated to drive out gases.

By the clauses "a capsule—physically separate from the electrode structure," "physically independent of the electrode structure," and "having an entity of its own and apart from that of the electrode structure," as used in the claims, we mean that the capsule forms no essential part of the electrode structure but may be secured either directly to the structure, as indicated in Figs. 2 and 5 of our drawing, or in a spaced relation, as shown in Figs. 3, 4, and 9, or may be mounted entirely independently of the electrode structure, as when the capsule is supported from a rod which is affixed to the stem of the tube.

The feature disclosed in this application of first heating the metal parts of an electrode structure by induction in order to remove gases therefrom and later vaporizing a getter which is secured to the metal parts, by moving the inductive field to a new position, is claimed in a divisional application, filed November 1, 1934, in the name of Ernest E. Charlton, Serial No. 751,048 and entitled Electric discharge devices and methods of manufacture.

What we claim as new and desire to secure by Letters Patent of the United States is:—

1. An electric discharge device comprising a sealed container, electrodes therein, a metal capsule physically separate from the electrodes and having crevices for the discharge of vapor and a charge consisting of a mixture of an active material and a reducing agent therein which is adapted to evolve a desired vapor when said capsule is heated by high frequency induced currents to a temperature sufficiently high to produce a chemical reaction in said charge.

2. An electron discharge device comprising a sealed container, an electrode structure therein, an electrically conductive capsule physically separate from said structure, said capsule being mounted upon said electrode structure within said envelope but spaced away therefrom and a reaction mixture in said capsule from which a desired vapor may be evolved by heating said capsule by high frequency induced currents to a reaction temperature.

3. The method of making a vacuum tube containing a highly reactive substance which consists in forming a mixture of a compound of said substance and a reducing agent, compacting said mixture under pressure into coherent form, heating in a vacuum to remove moisture, introducing the mixture while moisture-free into said tube, degasifying said tube, sealing the same and heating said mixture to a reaction temperature.

4. An electric discharge device comprising a sealed container, electrodes therein, a metal capsule physically separate from said electrodes and having crevices for the discharge of vapor, a charge therein which is adapted to evolve a desired vapor when said capsule is heated by high frequency induced currents to a temperature sufficiently high to volatilize said charge.

5. An electric discharge device comprising an envelope containing an electrode structure and a metal capsule physically separate from said structure, said capsule containing a vaporizable material and having an opening for the egress of the vapor, said capsule being pressed to form a pocket and having an end portion overlying the pocket for completely closing the same except for said opening.

6. An electric discharge device comprising a sealed container, electrodes therein, a metal capsule physically separate from said electrodes, said capsule having an opening for the discharge of vapor and a charge therein which is adapted to evolve a desired vapor when said capsule is heated by high frequency induced currents to a temperature sufficiently high to cause vaporization of said charge.

7. An electric discharge device comprising an envelope enclosing an electrode structure and a capsule containing vaporizable material, said capsule being complete in itself and having metal walls which are physically independent of the electrode structure.

8. An electric discharge device comprising an envelope including an electrode structure and capsule, said capsule being made entirely of a single piece of metal formed into a container, said container having an entity of its own and different from that of the electrode structure.

9. An electric discharge device comprising an envelope containing an electrode structure, a self-contained metal capsule and vaporizable material in said capsule, said capsule being unitary, structurally complete and mounted in a position as to be heated independently of said electrode structure.

10. An electric discharge device comprising an envelope containing an electrode structure and vaporizable material, said material being mounted apart from said structure and contained in a structurally complete, self-contained metal capsule.

ERNEST E. CHARLTON.
DOW O. WHELAN.

CERTIFICATE OF CORRECTION.

Patent No. 2,054,030. September 8, 1936.

ERNEST E. CHARLTON, ET AL.

It is hereby certified that error appears in the above numbered patent requiring correction as follows: Figures 10 and 11 as shown below should appear on the sheet of drawings as a part of the patent -

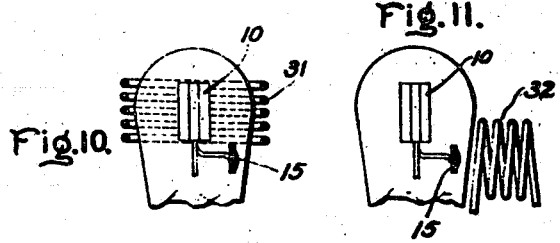

and that the said Letters Patent should be read with this correction therein that the same may conform to the record of the case in the Patent Office.

Signed and sealed this 12th day of January, A. D. 1943.

(Seal).

Henry Van Arsdale,
Acting Commissioner of Patents.

CERTIFICATE OF CORRECTION.

Patent No. 2,054,030.  September 8, 1936.

ERNEST E. CHARLTON, ET AL.

It is hereby certified that error appears in the above numbered patent requiring correction as follows: Figures 10 and 11 as shown below should appear on the sheet of drawings as a part of the patent -

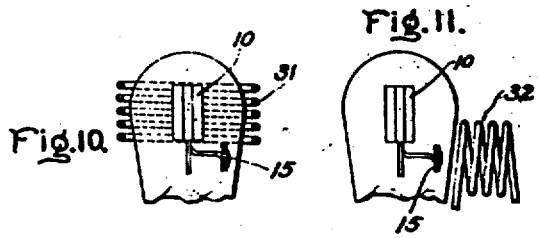

and that the said Letters Patent should be read with this correction therein that the same may conform to the record of the case in the Patent Office.

Signed and sealed this 12th day of January, A. D. 1943.

(Seal).

Henry Van Arsdale,
Acting Commissioner of Patents.